INVENTORS
JAMES R. ANDRES
JUDD F. GARRISON
BY
ATTORNEY

Oct. 8, 1963       J. R. ANDRES ETAL       3,106,128
MULTIPLE INSTRUMENT VIEWING DEVICE
Filed Aug. 10, 1960                       3 Sheets-Sheet 2

INVENTORS
JAMES R. ANDRES
BY JUDD F. GARRISON

ATTORNEY

Oct. 8, 1963  J. R. ANDRES ETAL  3,106,128
MULTIPLE INSTRUMENT VIEWING DEVICE
Filed Aug. 10, 1960  3 Sheets-Sheet 3

INVENTORS
JAMES R. ANDRES
BY JUDD F. GARRISON

ATTORNEY

United States Patent Office 3,106,128
Patented Oct. 8, 1963

3,106,128
MULTIPLE INSTRUMENT VIEWING DEVICE
James R. Andres and Judd F. Garrison, Grand Rapids, Mich., assignors, by mesne assignments, to Pneumo-Dynamics Corporation, Cleveland, Ohio, a corporation of Delaware
Filed Aug. 10, 1960, Ser. No. 48,751
6 Claims. (Cl. 88—24)

This invention provides a new and improved multiple instrument viewing device suitable for use in aircraft installations and the like where space is at a premium.

Due to the greater equipment density and the need of more instruments in high performance aircraft the instrument panel has become crowded to the point that the space problem is critical. By using a viewer incorporating this invention it is possible to mount flight instruments in a remote position behind the instrument panel and permit an individual such as a member of a flight crew to selectively view a number of instruments at a single position on the instrument panel. In this way the congestion of the panel is substantially reduced while still providing the flight crew with all the needed information.

Normally the flight instruments can be grouped so that a given group of instruments are used during one portion of the flight and another group during other portions. As an example one group of instruments are needed during the takeoff portion of the flight and another group of instruments are viewed during the cruise portion. Still a third or landing group of instruments are needed during the landing portion of the flight. By properly selecting the instruments mounted on each of one or more viewers the various groups of instruments can be selectively viewed as needed. This also increases pilot efficiency since only the needed instruments are presented thus reducing the possibility of confusion.

A viewer incorporating this invention also provides means to bring to the attention of the pilot certain critical conditions which require his corrective action. As an example, a fuel gage would automatically light a signal on the panel when only a predetermined quantity of fuel remains. When this occurs the pilot selects the fuel gage for viewing to permit him to determine what corrective action should be taken.

It is an important object of this invention to provide a multiple instrument viewing device wherein a plurality of instruments can be selectively viewed at a single location.

It is another important object of this invention to provide a multiple instrument viewing device which enables the selective viewing of any predetermined instrument or mechanism wherein the viewing area of the device consumes a minimum amount of space on the instrument panel of an aircraft or the like.

It is another important object of this invention to provide a self-illuminated viewing device suitable for use in aircraft installations wherein the environmental light condition varies widely during various flight periods.

It is another important object of this invention to provide a novel optical viewing system which provides high intensity reflected light so that the viewing device can be used in bright cockpit conditions.

It is another important object of this invention to provide an electrically controlled viewing device which enables selective viewing of a plurality of instruments or devices through a single viewing scope.

It is another important object of this invention to provide a multiple instrument viewing device having a single optical system which can be indexed to permit selective viewing of a plurality of separate instrument devices.

Further objects and advantages will appear from the following description and drawings wherein.

Figure 1:
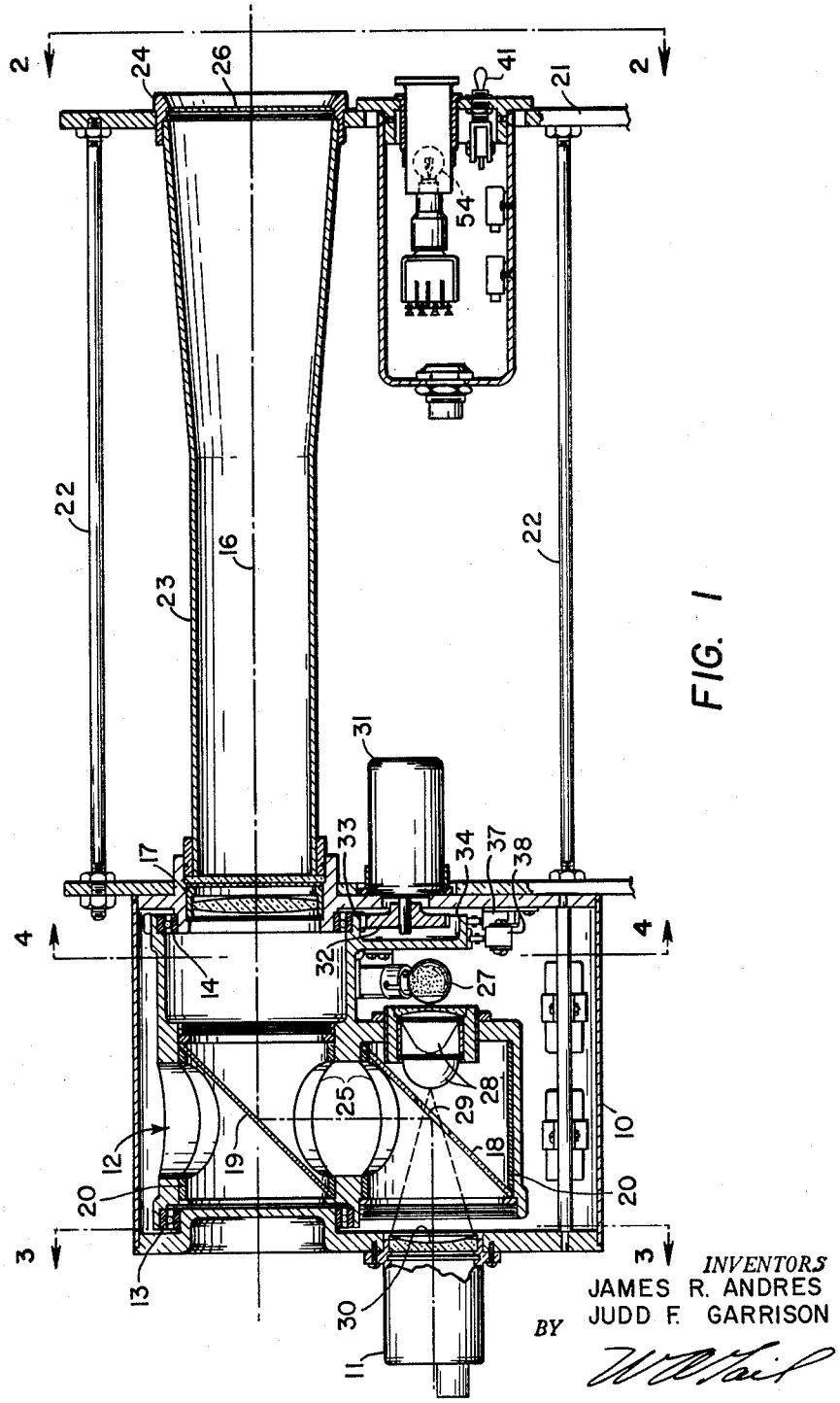
FIG. 1 is a side elevation showing the general structural arrangement of a preferred embodiment of this invention.

Referring to the drawings, FIG. 1 illustrates the preferred embodiment of a multiple instrument viewing device employing structure and incorporating this invention with the device comprising several basic assemblies. A frame 10 encloses the operating assemblies and provides a base on which a plurality of objects or instruments 11 are mounted. A rotating assembly 12 is journalled on bearings 13 and 14 for rotation about a central axis 16. An optical system is provided which comprises a lens set 17 mounted in the frame 10 and reflecting means in the form of a pair of parallel spaced mirrors 18 and 19 mounted on the rotating assembly 12. The mirrors 18 and 19 are each disposed in a cylindrical sleeve or tube member 20 having circular openings or apertures 25 in the respective side wall portion thereof with the openings 25 being disposed in alignment with each other as best illustrated in FIGURE 1 of the drawing. By using the mirrors 18 and 19 it is possible to mount each of the objects or instruments 11 at a position spaced from a central axis 16 so that a plurality of such objects or instruments can be viewed with a single device merely by indexing the rotary assembly 12 until the mirror 18 is positioned adjacent to the desired object or instrument 11. The lens set 17 however need not be mounted for rotation since the mirror 19 is aligned with the axis 16.

A panel face member 21 is adapted to be mounted on the instrument panel in the usual manner and supports the frame 10 through tie bolts 22. A mounting ring 24 on the panel face 21 supports the forward end of a tubular scope 23 and a frosted glass screen 26 on which the image of a selected one of the instruments 11 is projected.

Figure 5:
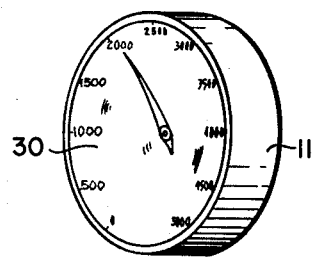
FIG. 5 is prospective fragmentary view of a preferred concave instrument face with a mirrored indicia for improved light reflection.

In order to illuminate the instruments 11 an adjustable light source must be provided since the environmental light within the cockpit of an aircraft is very bright at high altitudes during the day while total darkness exists during night operation. An incondescent light bulb 27 is mounted on the rotating assembly 12 and in cooperation with condenser lenses 28 provides a beam of light which is focused through a central aperture 29 in the mirror 18 for illumination of the face of the instrument 11 which has been selected to be viewed by the individual. The mirror 18 is located at a point spaced from the focal plane of the lens system 17 so the aperture 29 does not interfere with the image projected on the screen 26. This arrangement permits the use of direct lighting on the face of the selected instrument 11 with a light source located outside the image path. In practice it has been found that the aperture causes at most an area in the center of the screen which is slightly lower in light reflecting intensity. This does not produce any difficulty, however, since most instruments are of the type which include numbers around the periphery of the instrument face and a pointer indicating the correct reading. As shown in FIGURE 5 the face 30 of a selected one of the instruments 11 is concave so that the reflected light reflected back to the mirror 18 will be converging. The indicia on the instrument face and the pointer are also coated with a shiny material to obtain maximum reflection.

Figure 3:
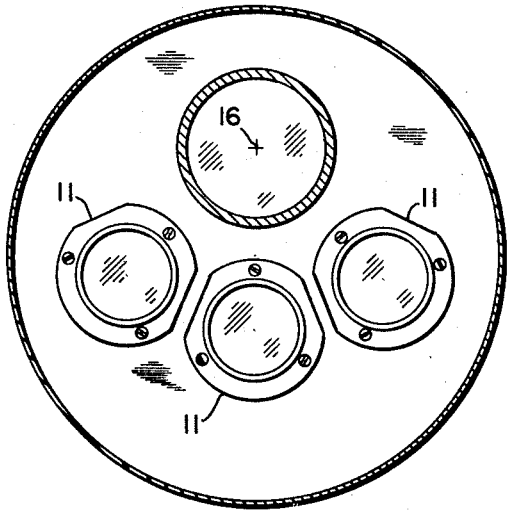
FIG. 3 is a cross section taken along 3—3 of FIG. 1 illustrating one arrangement of flight instruments.

Referring to FIGURE 3 the instruments 11 can be located symmetrically around the axis 16 in the manner illustrated. It should be understood that even though only three instruments 11 are shown in the particular structure illustrated more could be located around the complete circle, and the illustration of only three instruments 11 is intended in no way to limit the scope of the invention.

Referring again to FIGURE 1 a motor 31 is mounted on the frame 10 and provided with a pinion gear 32 which engages and drives an external gear 33 formed on the rotating assembly 12. Thus the motor 31 operates to rotate the assembly 12 to its various indexed position for selectively viewing any selected one of the instruments 11.

The motor 31 is provided with an internal gear reduction so that a simple external gear drive through the pinion gear 32 will provide the correct speed of indexing. Limit switches 36, 37, 38 and 39 are mounted on the frame 10 for operation by an arcuate cam 34 on the rotating assembly 12 to control the motor 31 for proper indexing operation.

Figure 7:
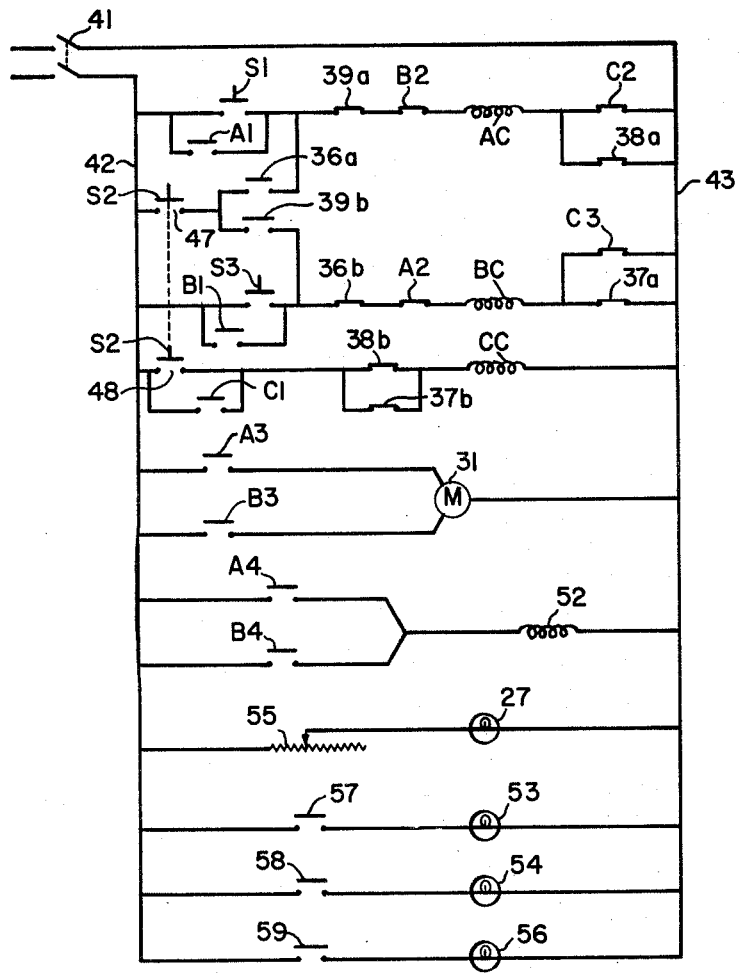
FIG. 7 is a line to line schematic of the electrical wiring circuit.

Reference should now be made to FIGURE 7 for an understanding of the control circuit of the device. A line switch 41 provides the power to the control system so that line voltage is provided across two main distribution lines 42 and 43. The motor 31 is adapted to be connected across the lines 42 and 43 by normally open interlocks A3 of a relay A for counterclockwise rotation or through a normally open interlock B3 of a relay B for clockwise rotation. A coil AC of the relay A is adapted to be connected across the lines 42 and 43 through series connected normally closed interlocks 39a and B2. The interlock 39a is provided by the limit switch 39 and the normally closed interlock B2 is opened whenever the relay B is energized to prevent short circuiting of the motor 31. A selector switch S1 connects the interlock 39a with the line 42 and is arranged in parallel with a normally open interlock A1 on the relay A. Thus when the relay A is energized the normally open interlock A1 serves as a holding circuit. The right side of the relay coil AC is connected to the line 43 by a normally closed interlock C2 of a relay C and a normally closed interlock 38a of the limit switch 38 connected in parallel with the interlock C2.

A coil BC of the relay B is connected in series with a normally closed interlock A2 on the relay A and a normally closed interlock 36a on the limit switch 36. The normally closed interlock 36a is connected in turn to the line 42 through a selector switch S3 and a parallel connected normally open interlock B1 on the relay B. Here again, the interlock B1 serves as a holding circuit for the relay B. The right side of the relay coil BC is connected to the line 42 through a normally closed interlock C3 on the relay C and a normally closed interlock 37a on the limit switch 37. A selector switch S2 is provided with two normally open interlocks 47 and 48. The interlock 47 connects the line 42 with both interlock 36a and 39b on the limit switches 36 and 39 respectively. The normally open interlock 36a is connected to the left side of the normally closed interlock 39a and the normally open interlock 39b is connected to the left side of the normally closed interlock 36b. Thus if the limit switch 36 operated to close the interlock 36a and open the interlock 36b when the selector switch S2 is closed the relay A is energized. Conversely if the limit switch is operated to close the interlock 39b and open the interlock 39a when the selector switch S2 is operated the relay B is energized.

A coil CC of the relay C is connected to the power line 43 and connected in parallel to the normally closed interlocks 38b and 37b on the limit switches 38 and 37 respectively. Both of these normally closed interlocks are in turn connected to the power line 42 through the normally open interlock 48 on the selector switch S2. A normally open interlock C1 is connected in parallel with the interlock 48 and serves as a holding circuit for the relay C.

In operation if the selector switch S1 is closed and the rotating assembly 12 is at either of the two indexed positions wherein a lobe 49 of the cam 34 is spaced from the limit switch 39, the coil AC of the relay A is energized closing the holding interlock A1. As soon as the relay A is energized the normally open interlock A3 is closed operating the motor 31 to rotate the rotating assembly 12 in a counterclockwise direction. This continues until the cam lobe 49 engages the limit switch 39 opening the normally closed interlock 39a. When the limit switch 39 is engaged by the lobe 49 the interlock 39a is open causing the relay A to drop out and thus stop the motor 31. Operation of the limit switch 38 during the movement to the position at the limit switch 39 does not interfere with the operation of the motor 31 because the normally closed interlock C2 is connected in parallel with the interlock 38a. While the relay A is energized the normally closed interlock A2 is open preventing accidental operations of the relay B and consequent short circuiting of the system.

If the selector switch S3 is depressed and the rotating assembly 12 is at any position other than the indexed position to the extreme clockwise position the relay B is energized. As soon as this occurs the holding interlock B1 is closed to hold the relay B in the energized position until the lobe 49 on the cam 34 engages the limit switch 36 and opens the interlock 36b. Here again engagement of the lobe 49 with the limit switch 36 de-energizes the relay B and brings the motor 31 to a stop at the proper indexed position. The engagement of the limit switch 37 during the movement to the extreme clockwise position does not effect the operation of the motor 31 since the interlock C3 is connected in parallel to the interlock 37a.

Figure 6:
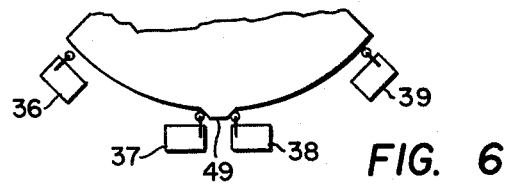
FIG. 6 is a schematic fragmentary view of the cam and limit switch arrangement.

When the selector switch S2 is operated to move the rotating assembly 12 to the mid-position illustrated in FIGURE 6 the relay C is energized closing the normally open interlock C1 as a holding circuit and at the same time opening both the interlock C2 and C3. Assuming that the cam lobe 49 is in the extreme counterclockwise position adjacent to the limit switch 39 when the selector switch S is operated then the relay B must be energized to produce clockwise rotation of the assembly 12 carrying forward with this assumption, if the cam lobe 49 is at the position adjacent to the limit switch 39 the normally open interlock 39b is closed so operation of the selector switch S2 will cause the relay B to be energized as well as the relay C and the relay A will not be operated. The relays B and C are therefore both energized and the motor 31 will operate until the cam lobe 49 engages the limit switch 37 opening the normally closed interlock 37a. This causes the relay B to be de-energized because the interlock C3 is open. The various elements are proportioned so that both the limit switches 37 and 38 are operated when the cam lobe 49 is in the mid-position shown in FIGURE 6 so both of the interlocks 38b and 37b will be open causing the relay C to drop out.

If it is assumed that the cam lobe 49 is at the position a part of said time constant, a housing, a movable wall at the limit switch 36 when the selector switch S2 is closed the relay A will be energized along with the relay C and the assembly 12 will rotate in a counterclockwise direction. In this case the interlock 36a is closed and the interlock 39b is open. When the cam lobe 49 reaches the position shown in FIGURE 6 the interlock 38a is opened and the relay A drops out, thus stopping the motor 31.

Also the relay C is dropped out by the opening of both the interlocks 38b and 37b.

To insure that the rotating assembly 12 remains in the indexed position the motor 31 should be provided with a normally applied electrically released brake. A brake operating coil 52 is energized when either the relay A or the relay B is energized. For this purpose the relay A is provided with a normally open interlock A4 and the relay B is provided with a normally open interlock B4. As soon as both of the relays A and B are de-energized a brake automatically locks the motor 31 against rotation and securely positions the rotating assembly 12 in its desired indexed position.

Figure 2:
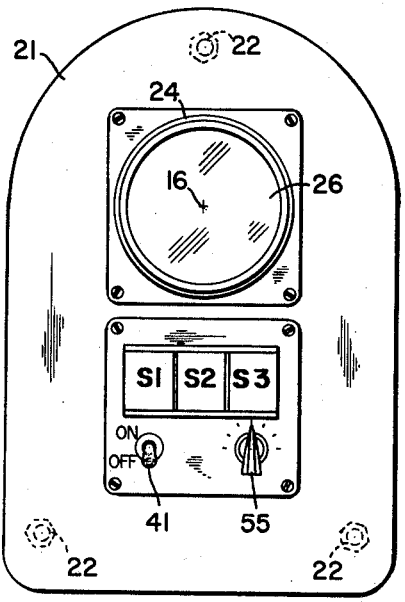
FIG. 2 is a front elevation of the viewing device illustrating the control panel portion of the mechanism
Figure 4:
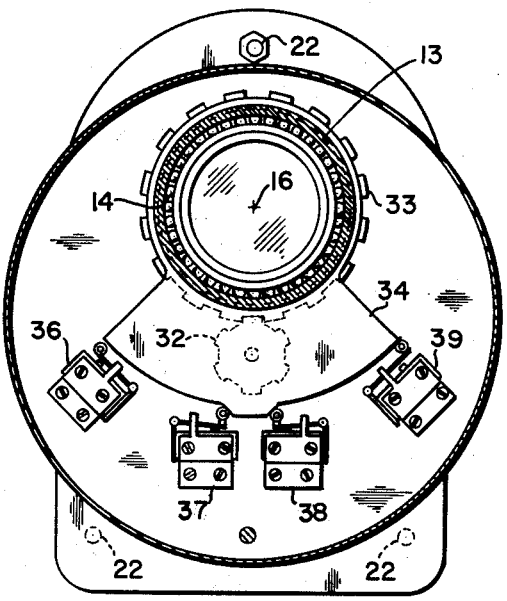
FIG. 4 is a cross section taken along 4—4 of FIG. 1 illustrating a cam and limit switch structure used to properly position the reflecting system for viewing each instrument.

The light bulb 27 is connected across the lines 42 and 43 through a rheostat 55 which is preferably located on the face of the panel member 21 as illustrated in FIGURE 2. Therefore the intensity of the light can be adjusted by the flight crew to provide any desired image intensity. The selector switches S1, S2, and S3 are of the push button type having transparent plastic caps in which are located three warning lights 53, 54 and 56 respectively. These warning lights are used to inform the flight crew when a critical condition is registered by any one of the instruments 11.

As an example, if one of the instruments 11 being viewed by depressing the selector switch S1 is the fuel gage the instrument 11 associated with the selector switch S1 should be provided with a normally open interlock 57 which is closed whenever only a predetermined amount of fuel remains. When the interlock 57 is closed the warning light 53 is lit causing the pilot to be informed that he should inspect or view the associated instrument by pressing the selector switch S1. After the instrument is read by the pilot the necessary corrective action can be taken. Similarly, normally open interlocks 58 and 59 are connected in series with the lights 54 and 56 respectively, to indicate one or more critical conditions related to the associated flight instrument.

Although the viewing device incorporating this invention is illustrated in connection with a structure including only three instruments it should be recognized that other structural arrangements could be utilized wherein more instruments are used providing the optical system and the indexing mechanism are made compatible with such other arrangements.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

We claim:

1. A multiple object viewing device comprising a screen on which objects can be viewed, a rotating assembly journalled for rotation about an axis intersecting said screen, a plurality of objects mounted at positions symmetrically located around said axis, reflecting means on said assembly adapted to selectively turn images of said objects to said axis, said reflecting means comprising a reflecting element formed with a central aperture, a light mounted on said assembly adapted to project light through said aperture and illuminate said objects, an optical system cooperating with said reflecting means to project images of said objects on said screen, said reflecting element being positioned at a location where said aperture is spaced from a focal plane of said optical system.

2. A multiple object viewing device comprising a screen on which objects can be viewed, a rotating assembly journalled for rotation about an axis intersecting said screen, a plurality of objects mounted at positions symmetrically located around said axis, reflecting means on said assembly adapted to selectively turn images of said objects to said axis, said reflecting means comprising a reflecting element formed with a central aperture, a light mounted on said assembly adapted to project light through said aperture and illuminate said objects, an optical system cooperating with said reflecting means to project images of said objects on said screen, said reflecting element being positioned at a location where said aperture is spaced from a focal plane of said optical system, and motor means connected to rotate said assembly to predetermined positions wherein the images of said objects are selectively projected on said screen.

3. A multiple instrument viewing device for use on instrument panels comprising a screen mounted on said panel, a rotating assembly journalled for rotation about an axis aligned with said screen and having one end spaced from the panel, a plurality of instruments mounted at positions symmetrically located around said axis and adjacent to the other end of the rotating assembly, reflecting means on said assembly adapted to selectively turn images of said instruments to said axis, said reflecting means comprising a reflecting element formed with a central aperture, an adjustable light source mounted on said assembly adapted to project light through said aperture and illuminate said instruments, an optical system cooperating with said reflecting means to project images of said objects on said screen, said reflecting element being positioned at a location where said aperture is spaced from a focal plane of said optical system, said instruments being formed with concave faces having reflecting indicia proportioned to reflect light of illumination along converging paths, a motor connected to rotate said assembly, and control means connected to operate said motor to move said assembly to selected positions adjacent to said instruments.

4. A multiple instrument viewing device comprising a panel, a tubular scope arranged at right angles with the panel and having one end secured to the panel, a screen disposed in the tubular scope and substantially flush with the panel, a frame disposed adjacent to the other end of the tubular scope, a rotating assembly mounted in the frame for rotation on a longitudinal axis in alignment with the longitudinal axis of the tubular scope, a lens positioned adjacent said other end of the tubular scope, a pair of parallel spaced mirrors mounted in the rotating assembly and arranged at an angle with respect to the longitudinal axes of the tubular scope and the rotating assembly and one of the mirrors being intersected by the longitudinal axes of the tubular scope and the rotating assembly and the other of the mirrors being spaced from the longitudinal axes of the tubular scope and the rotating assembly and provided with an aperture, a plurality of instruments mounted on the frame opposite said other of the mirrors at positions symmetrically located around the longitudinal axes of the tubular scope and the rotating assembly, and a source of light mounted on the rotating assembly opposite said other of the mirrors for illuminating the instruments through the aperture in said other of the mirrors.

5. A multiple instrument viewing device comprising a panel, a tubular scope arranged at right angles with the panel and having one end secured to the panel, a screen disposed in the tubular scope and substantially flush with the panel, a frame disposed adjacent to the other end of the tubular scope, a rotating assembly mounted in the frame for rotation on a longitudinal axis in alignment with the longitudinal axis of the tubular scope, a lens positioned adjacent said other end of the tubular scope, a pair of parallel spaced mirrors mounted in the rotating assembly and arranged at an angle with respect to the longitudinal axes of the tubular scope and the rotating assembly and one of the mirrors being intersected by the longitudinal axes of the tubular scope and the rotating assembly and the other of the mirrors being spaced from the longitudinal axes of the tubular scope and the rotating assembly and provided with an aperture, a plurality of instruments mounted on the frame opposite said other of the mirrors at positions symmetrically located around the longitudinal axes of the tubular scope and the rotating assembly, a source of light mounted on the rotating assembly opposite said other of the mirrors for illuminating the instruments through the aperture in said other of the mirrors, a motor connected to rotate the rotating assembly, and control means connected to operate the motor to move the rotating assembly to selected positions adjacent to the instruments.

6. In combination with a panel,
a device for enabling a plurality of instruments to be disposed at locations remote from the panel whereat the instruments may each be selectively viewed by an individual,
said device comprising
frame structure having a screen on which images of the instruments may be projected and
base structure to which said instruments are mounted at locations thereon which are equi-distantly spaced from an axis that intersects the screen,
an optical system for projecting images of a selected one of the instruments onto said screen in response to desired conditions as required by such individual, said optical system comprising
reflector means,
a rotating assembly for rotating the reflector means about the axis between a plurality of selected positions each of which enable a single image of the selected one of the instruments to be viewed on the screen,
said reflector means having an aperture disposed at a location thereon which is spaced from a focal plane of the optical system, and
a source of light carried by the rotating assembly for common rotation with the reflector means about said axis for enabling the reflector means to illuminate the selected instrument and project the image thereof through the aperture of the reflector means.

References Cited in the file of this patent

UNITED STATES PATENTS

| | | |
|---|---|---|
| 1,756,785 | Gallasch | Apr. 29, 1930 |
| 1,763,482 | Scheppmann | June 10, 1930 |
| 2,305,775 | Hansen | Dec. 22, 1942 |
| 2,401,691 | Luboshez | June 4, 1946 |